United States Patent
Li et al.

(10) Patent No.: US 10,472,180 B2
(45) Date of Patent: Nov. 12, 2019

(54) CONVEYING AND POSITIONING SYSTEM AND METHOD

(71) Applicants: GUANGZHOU MINO AUTOMOTIVE EQUIPMENT CO., LTD., Guangzhou (CN); MINO AUTOMOTIVE EQUIPMENT (SHANGHAI) CO., LTD., Shanghai (CN)

(72) Inventors: Junhui Li, Guangzhou (CN); Meng Yang, Guangzhou (CN); Hongchen Zhang, Guangzhou (CN); Zhencheng Chen, Guangzhou (CN); Qing Li, Guangzhou (CN)

(73) Assignees: Guangzhou MINO Automotive Equipment Co., Ltd., Guangzhou (CN); Mino Automotive Equipment (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 15/906,825

(22) Filed: Feb. 27, 2018

(65) Prior Publication Data
US 2018/0305134 A1    Oct. 25, 2018

Related U.S. Application Data

(63) Continuation of application No. PCT/CN2017/104679, filed on Sep. 30, 2017.

(30) Foreign Application Priority Data

Apr. 19, 2017    (CN) .......................... 2017 1 0257444

(51) Int. Cl.
B65G 43/00    (2006.01)
B65G 13/07    (2006.01)
(Continued)

(52) U.S. Cl.
CPC .............. *B65G 43/00* (2013.01); *B65G 13/07* (2013.01); *B65G 35/06* (2013.01); *B65G 43/08* (2013.01);
(Continued)

(58) Field of Classification Search
CPC ........ B65G 43/00; B65G 43/08; B65G 13/07; B65G 35/06; B62D 65/18; G05B 18/39
(Continued)

(56) References Cited

U.S. PATENT DOCUMENTS 5,280,223 A * 1/1994 Grabowski .............. B60K 6/46
318/139
6,109,568 A * 8/2000 Gilbert .................. B61L 23/005
104/88.03
(Continued)

FOREIGN PATENT DOCUMENTS

CN    201125077    10/2008
CN    202522869 U    11/2012
(Continued)

*Primary Examiner* — Douglas A Hess
(74) *Attorney, Agent, or Firm* — M&B IP Analysts, LLC

(57) ABSTRACT

Disclosed is a conveying and positioning system and method, which is applied in the technical field of conveyance in the automotive industry and comprises a roller machine, a conveying trolley and an intelligent variable-frequency controller, wherein the conveying trolley is provided with a reflector; the roller machine is provided with a driving mechanism and a distance sensor; and, the driving mechanism comprises a driving motor controlled by the intelligent variable-frequency controller and a rotary encoder capable of feeding back rotation speed information of the driving motor to the intelligent variable-frequency controller. In the present invention, with the intelligent variable-frequency controller, by reading position information fed back by the distance sensor and rotation speed information fed back by the rotary encoder, accurate voltage (Continued)

frequency control information is output by internal operation so as to control the rotation speed of the driving motor, so that a double closed loop control mode of the conveying and positioning system is realized. In the present invention, fast conveyance, accurate positioning and stable operation of the conveying trolley can be realized by the technical solutions in the double closed loop control mode, and the cost is low.

10 Claims, 10 Drawing Sheets

(51) Int. Cl.
  *B65G 35/06* (2006.01)
  *B65G 43/08* (2006.01)
  *G05B 19/39* (2006.01)
  *B62D 65/18* (2006.01)
(52) U.S. Cl.
  CPC ...... *G05B 19/39* (2013.01); *B65G 2201/0294* (2013.01); *B65G 2203/0283* (2013.01); *B65G 2203/0291* (2013.01); *B65G 2203/042* (2013.01); *B65G 2203/044* (2013.01)
(58) Field of Classification Search
  USPC ................... 198/617, 750.2, 751; 701/19, 20
  See application file for complete search history.

(56) References Cited

U.S. PATENT DOCUMENTS

| | | | | |
|---|---|---|---|---|
| 7,387,195 | B2* | 6/2008 | Bonham | G05B 19/41845 198/349.1 |
| 8,364,309 | B1* | 1/2013 | Bailey | G06N 3/008 700/245 |
| 8,965,619 | B2* | 2/2015 | Sullivan | G05D 1/0272 701/23 |
| 8,989,917 | B2* | 3/2015 | Kumar | B61L 3/006 701/19 |
| 9,098,084 | B2* | 8/2015 | Kumazawa | G05B 19/416 |
| 9,459,624 | B2* | 10/2016 | Kuklish | G05D 1/02 |
| 10,108,193 | B2* | 10/2018 | Wernersbach | G05D 1/0011 |
| 10,137,912 | B2* | 11/2018 | de Albuquerque Gleizer | B61L 15/0027 |
| 2001/0037746 | A1* | 11/2001 | Lund | |
| 2011/0144849 | A1* | 6/2011 | Wang | |
| 2018/0339720 | A1* | 11/2018 | Singh | |

FOREIGN PATENT DOCUMENTS

| | | |
|---|---|---|
| CN | 205076410 U | 3/2016 |
| CN | 205574942 U | 9/2016 |
| JP | 2016130145 A | 7/2016 |

* cited by examiner

J-J

K

CONVEYING AND POSITIONING SYSTEM AND METHOD

CROSS-REFERENCE TO RELATED APPLICATIONS

This application is a continuation application of an International Application No. PCT/CN2017/104679 filed Sep. 30, 2017, which claims priority under 35 USC 119 from Chinese Application No. 201710257444.7 CN, filed Apr. 19, 2017, now pending.

TECHNICAL FIELD

The present invention is applied in the technical field of conveyance in the automotive industry, and particularly relates to a high-speed and high-accuracy conveying and positioning system and method for realizing conveyance in an automobile welding workshop.

BACKGROUND

In the technical field of welding and conveyance of a white body of an automobile, a roller machine, as a common workpiece conveying device, plays an important role in conveying material. To fulfill the requirements for high flexibility and fast production cycle, the roller machine is required to convey the workpieces rapidly and smoothly with high accuracy. However, roller machines widely used at present realize the positioning of a conveying trolley by a conventional proximity switch or a grating encoded scale, resulting in low conveying speed, low accuracy and high cost.

SUMMARY

To solve the problems, the present invention provides a conveying and positioning system and method, which can realize the fast conveyance, accurate positioning and stable operation for a conveying trolley and have a low cost.

The technical solution adopted by the invention to solve the technical problems can be summarized as:

A conveying and positioning system, comprising:
a conveying trolley provided with a reflector,
an intelligent variable-frequency controller, and
a roller machine provided with a driving mechanism capable of driving the conveying trolley to move on the roller machine and a distance sensor capable of cooperating with the reflector to provide position information of the conveying trolley in a conveying process to the intelligent variable-frequency controller, the driving mechanism comprising:
a driving motor controlled by the intelligent variable-frequency controller, and
a rotary encoder capable of feeding back rotation speed information of the driving motor to the intelligent variable-frequency controller.

As a further improvement to the technical solution of the present invention, the reflector is disposed on a first mounting plate which is mounted on the conveying trolley via a hinge; the distance sensor is mounted on the roller machine in a forward direction of the first mounting plate via a first mounting seat; and, the first mounting seat is provided with a first guide face capable of guiding the first mounting plate to rotate about the hinge so as to allow the reflector to skim over the distance sensor when moving to a position where the distance sensor is located.

As a further improvement to the technical solution of the present invention, the first mounting plate is mounted at a bottom of the conveying trolley via a top hinge; the first mounting plate is formed with a fitting surface at either side of the reflector; the first mounting seat is provided with two lugs between which the distance sensor is mounted; the first guide face, with an arc shape and capable of fitting with the fitting surface, is formed on a top of each of the two lugs; and, the conveying trolley is provided with a first resetting mechanism capable of maintaining the first mounting plate in a vertical state.

As a further improvement to the technical solution of the present invention, the reflector is fixed to the conveying trolley via a second mounting plate; the distance sensor is mounted to the roller machine via a second mounting seat, and the distance sensor is staggered with the reflector in a forward direction of the conveying trolley; and, the reflector is inclined to a conveying direction to form a reflective surface directly facing the distance sensor.

As a further improvement to the technical solution of the present invention, the reflector is mounted on the conveying trolley via a swing bar mechanism; the swing bar mechanism comprises a third mounting plate provided on the conveying trolley, a swing bar hinged onto the third mounting plate via a hinge pin, and a bracket capable of limiting swing angle of the swing bar; the reflector is disposed on the swing bar, and the distance sensor is mounted on the roller machine in a forward direction of the reflector via a third mounting seat; the roller machine is provided with a first guide seat opposite to the distance sensor; and, the first guide seat is provided with a second guide face capable of guiding the swing bar to rotate upward about the hinge pin so as to allow the reflector to skim over the distance sensor when moving to a position where the distance sensor is located.

As a further improvement to the technical solution of the present invention, the swing bar is provided with a spherical roller capable of being in rolling fit with the second guide face and a second resetting mechanism capable of driving the swing bar to reset.

As a further improvement to the technical solution of the present invention, the reflector is mounted on the conveying trolley via a climbing mechanism; the climbing mechanism comprises a fourth mounting plate disposed on the conveying trolley, a guide bar seat disposed on the fourth mounting plate, a guide bar mounted on the guide bar seat in such a way that the guide bar is able to float up and down, and a floating seat disposed at a lower end of the guide bar; the reflector is directly or indirectly connected to the floating seat; the distance sensor is mounted on the roller machine in a forward direction of the reflector via a fourth mounting seat; the roller machine is provided with a second guide seat opposite to the distance sensor; and, the second guide seat has a third guide face capable of guiding the floating seat to float upward so as to allow the reflector to skim over the distance sensor when moving to a position where the distance sensor is located.

As a further improvement to the technical solution of the present invention, the guide bar seat is provided with at least two guide bar via holes running through in an up-and-down direction; within each guide bar via hole is provided with a guide bar and an oil-free bushing fitted with the corresponding guide bar; the guide bar is provided with a boss, and within the guide bar seat is provided with a third resetting mechanism for resisting against the boss so as to push the guide bar downward; and, the floating seat has a bottom with a roller capable of being in rolling fit with the third guide face.

As a further improvement to the technical solution of the present invention, the driving mechanism comprises a plurality of roller sets which are provided on the roller machine and driven by the driving motor; the roller sets are successively arranged on the roller machine to form, on its top, a conveying plane for conveying the conveying trolley; each of the roller sets comprises a wheel shaft and a conveying wheel disposed at either end of the wheel shaft, a belt wheel is provided between the conveying wheels at two ends of the wheel shaft, and two adjacent wheel shafts are connected by a synchronous belt mounted between the belt wheels; the roller sets comprise a driving roller set located in the middle of the roller machine and at least one driven roller set distributed at either side of the driving roller set; the driving motor has an output in transmission connection to the driving roller set; and, the conveying trolley is provided with a guide block at a bottom of each of front and rear ends of the conveying trolley, the roller machine is provided with a plurality of guide wheels at each of front and rear ends of the roller machine, and the guide wheels at the front and rear ends of the roller machine form a passageway for guiding the guide blocks to pass therethrough.

The present invention further provides a conveying and positioning method, comprising:

controlling, by an intelligent variable-frequency controller, a driving motor on a roller machine to drive a conveying trolley to move along the roller machine, such that, along with the conveying trolley, a reflector disposed on the conveying trolley entering a detection range of a distance sensor disposed on the roller machine;

recognizing, by the distance sensor, position information of the conveying trolley in a conveying process by receiving a signal from the reflector, and feeding back the position information to the intelligent variable-frequency controller;

feeding back, by a rotary encoder, rotation speed information of the driving motor to the intelligent variable-frequency controller;

combining, by the intelligent variable-frequency controller, the position information of the conveying trolley fed back by the distance sensor and the rotation speed information of the driving motor fed back by the rotary encoder, and comparing the position information with a target position information of the conveying trolley preset in the intelligent variable-frequency controller;

outputting an accurate voltage frequency controller information to control the rotation speed of the driving motor to slow down the conveying trolley; and, controlling, by the intelligent variable-frequency controller, the driving motor to stop rotating upon the conveying trolley reaching a preset position, so that realizing an accurate positioning for the conveying trolley.

The present invention has the following beneficial effects. In the present invention, with the intelligent variable-frequency controller, by reading position information fed back by the distance sensor and rotation speed information fed back by the rotary encoder, accurate voltage frequency control information is output by internal operation so as to control the rotation speed of the driving motor, so that a double closed loop control mode for the conveying and positioning system is realized. In the present invention, fast conveyance, accurate positioning and stable operation of the conveying trolley can be realized by the technical solutions in the double closed loop control mode, and the cost is low.

BRIEF DESCRIPTION OF THE DRAWINGS

The present invention will be further described below with reference to the accompanying drawings, wherein.

DETAILED DESCRIPTION

Referring to FIG. 1 to FIG. 20, the specific structures of preferred embodiments of the present invention are shown. The structural characteristics of each component in the present invention will be described below in detail. If the description involves a direction (upper, lower, left, right, front and rear), the structures shown in FIG. 1, FIG. 6, FIG. 9 and FIG. 14 are used as a reference, but the direction in practical applications of the present invention is not limited thereto.

Figure 1:
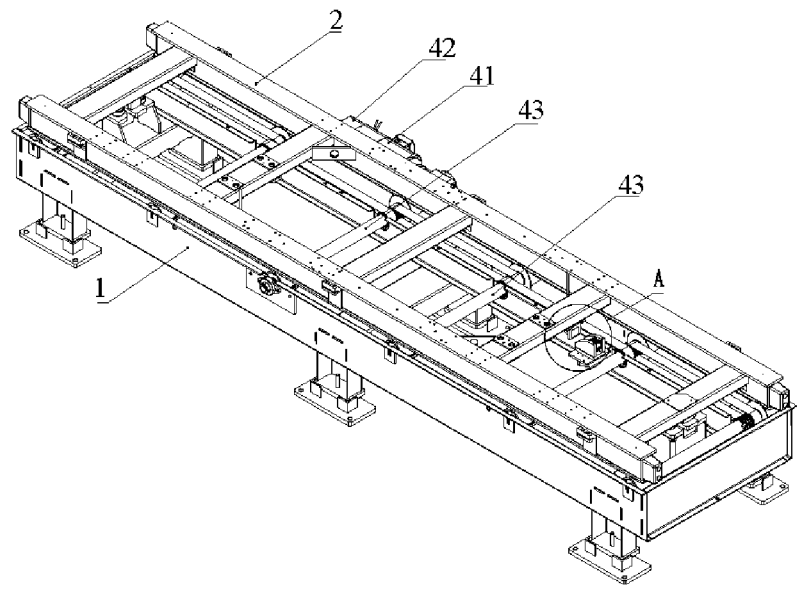
FIG. 1 is an axonometric diagram of an overall structure of a first embodiment of the present invention.

The present invention provides a conveying and positioning system, referring to FIG. 1, including a roller machine 1, a conveying trolley 2 and an intelligent variable-frequency controller. The roller machine 1 can be successively arranged at successive stations. A reflector 31 is provided on the conveying trolley 2. A driving mechanism capable of driving the conveying trolley 2 to move on the roller machine 1 and a distance sensor 32 capable of cooperating with the reflector 31 to provide position information of the conveying trolley 2 in the conveying process to the intelligent variable-frequency controller are provided on the roller machine 1, wherein the driving mechanism includes a driving motor 41 controlled by the intelligent variable-frequency controller, a rotary encoder 42 capable of feeding back rotation speed information of the driving motor 41 to the intelligent variable-frequency controller, and a number of roller sets 43 which are arranged on the roller machine 1 and driven by the driving motor 41. The roller sets 43 are successively arranged on the roller machine 1 to form, on its top, a conveying plane for conveying the conveying trolley 2. Each of the roller sets 43 includes a wheel shaft and a conveying wheel disposed at either end of the wheel shaft, a belt wheel is provided between the conveying wheels at two ends of the wheel shaft, and two adjacent wheel shafts are connected by a synchronous belt mounted on the belt wheel. The roller sets 43 include a driving roller set located in the middle of the roller machine 1 and at least one driven roller set distributed on either side of the driving roller set. The driving motor 41 has an output in transmission connection to the driving roller set. During the operation, the conveying trolley 2 falls on a next roller machine 1 from a previous roller machine 1, the driving motor 41 drives the driving roller set and the driven roller sets on the roller machine 1 to rotate, and the conveying trolley 2 is moved horizontally on the roller machine 1 by virtue of the friction of a lower surface of the conveying trolley with the driving roller set and the driven roller sets.

Figure 3:
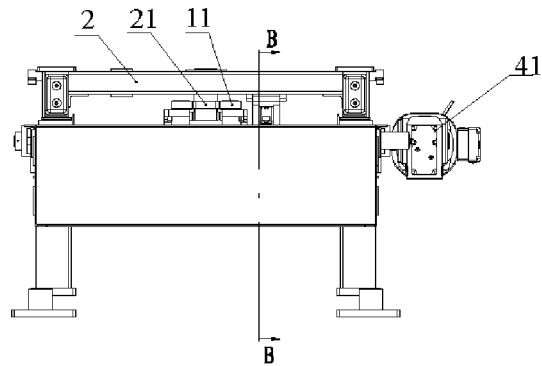
FIG. 3 is a side view of the overall structure of the first embodiment of the present invention.

Referring to FIG. 3, the conveying trolley 2 is provided with a guide block 21 at a bottom of each of front and rear ends of the conveying trolley 2, and the roller machine 1 is provided with several guide wheels 11 at each of front and rear ends of the roller machine 1, which form a passageway for guiding the guide blocks 21 to pass therethrough. The guide blocks 21 are cooperated with the guide wheels 11 to realize an accurate positioning for the conveying trolley 2.

Figure 2:
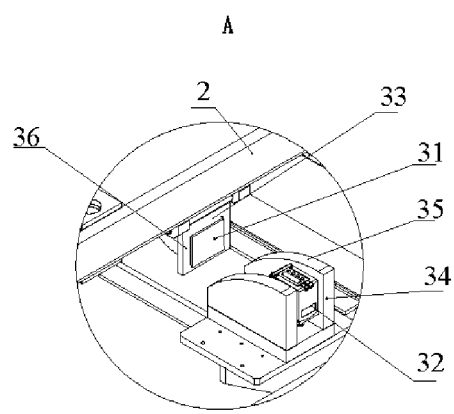
FIG. 2 is a partially enlarged view of part A in FIG. 1.
Figure 4:
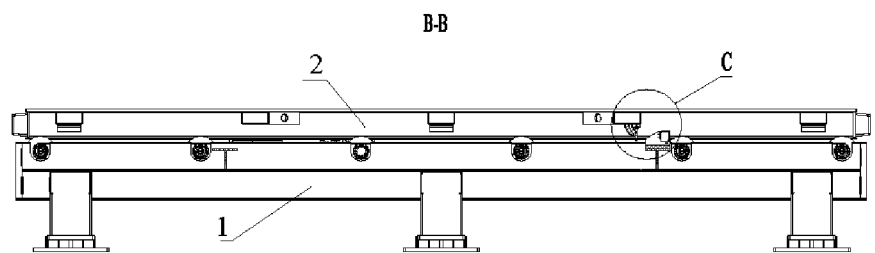
FIG. 4 is a sectional view taken along line B-B in FIG. 3.
Figure 5:
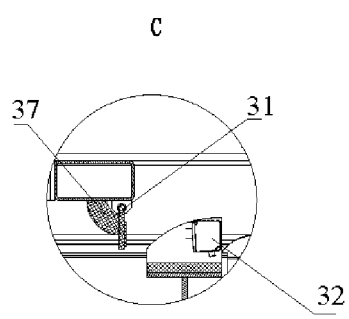
FIG. 5 is a partially enlarged view of part C in FIG. 4.

As a preferred implementation of the present invention, referring to FIG. 2, FIG. 4 and FIG. 5, the reflector 31 is disposed on a first mounting plate 33 which is mounted on the conveying trolley 2 via a hinge. The distance sensor 32 is mounted on the roller machine 1 in a forward direction of the mounting plate 33 via a first mounting seat 34; and, the first mounting seat 34 is provided with first guide faces 35 capable of guiding the first mounting plate 33 to rotate about the hinge so as to allow the reflector 31 to skim over the distance sensor 32 when moving to the position of the reflector 31, so that the reflector 31 can be prevented from colliding with the distance sensor 32.

Further, the first mounting plate 33 is mounted on the bottom of the conveying trolley 2 via a top hinge. The first mounting plate 33 is formed with a fitting surface 36 at either side of the reflector 31. The first mounting seat 34 is provided with two lugs between which the distance sensor 32 is mounted. The distance sensor 32 is hidden within the first mounting seat 34, and realizes a distance detection function by the clearance between the two lugs. The first guide face 35, with an arc shape and capable of fitting with the fitting surfaces 36 is provided on a top of each of the two lugs. The first guide faces 35 can guide the first mounting plate 33 to rotate about the hinge so as to allow the reflector 31 to skim over the distance sensor 32 when moving to a position where the distance sensor is located, so that the reflector 31 can be prevented from colliding with the distance sensor 32. The conveying trolley 2 is provided with a first resetting mechanism 37 capable of maintaining the first mounting plate 33 in a vertical state, thereby ensuring the first mounting plate can be automatically recovered to the vertical state after skimming over the first mounting seat 34.

Figure 6:
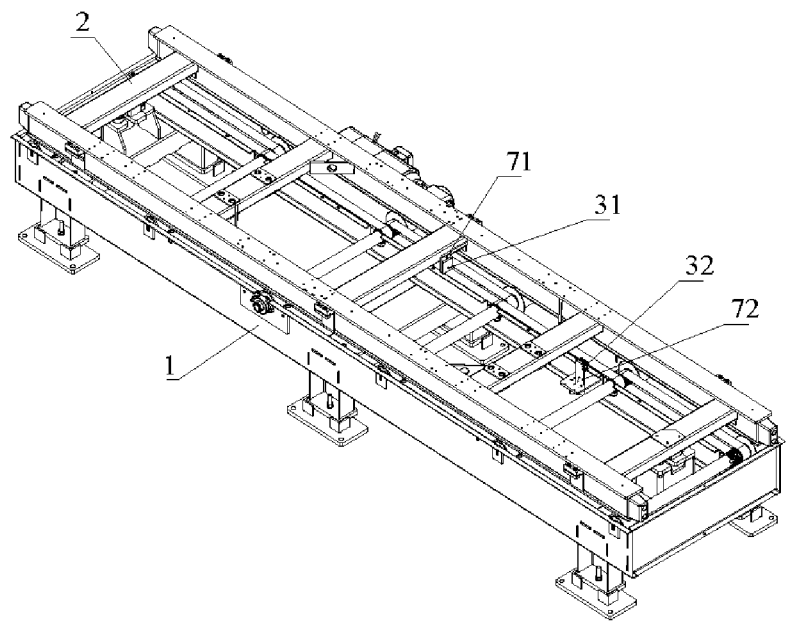
FIG. 6 is an axonometric diagram of an overall structure of a second embodiment of the present invention.
Figure 7:
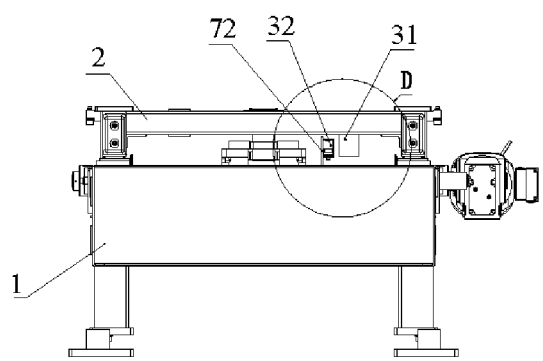
FIG. 7 is a side view of the overall structure of the second embodiment of the present invention.
Figure 8:
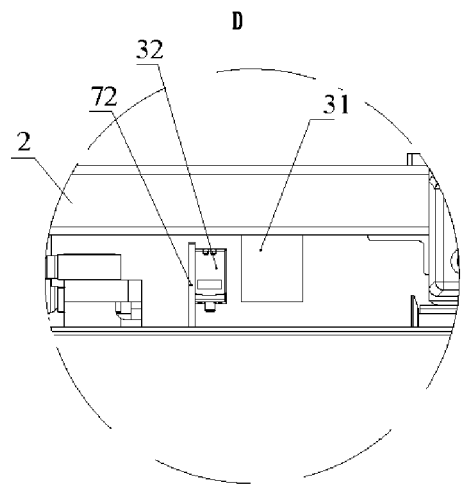
FIG. 8 is a partially enlarged view of part D in FIG. 7.
Figure 9:
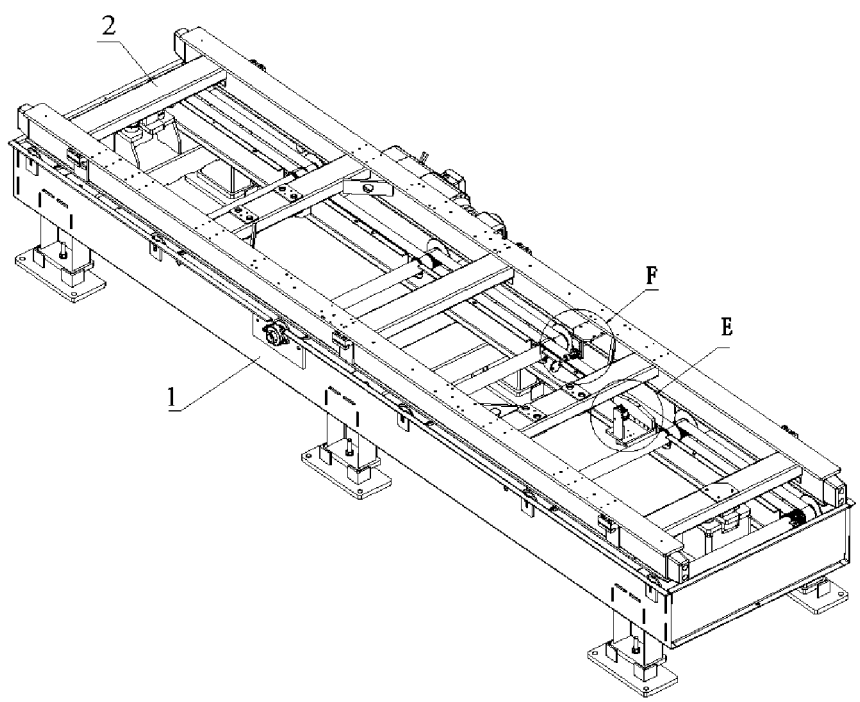
FIG. 9 is an axonometric diagram of an overall structure of a third embodiment of the present invention.
Figure 10:
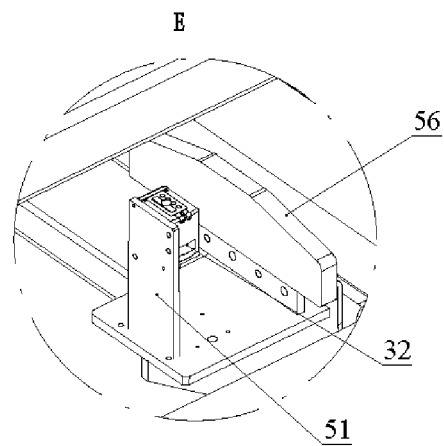
FIG. 10 is a partially enlarged view of part E in FIG. 9.
Figure 11:
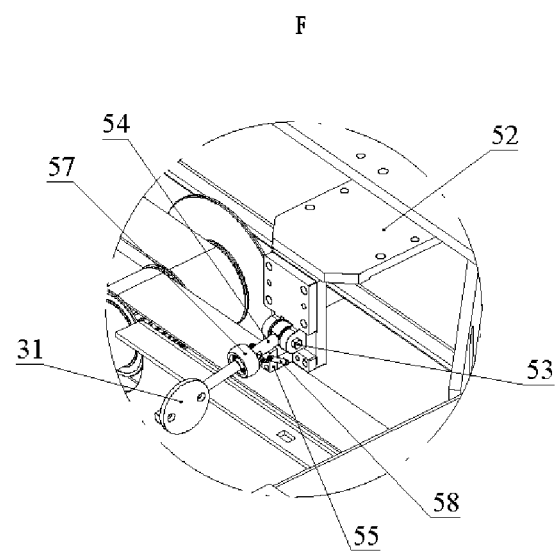
FIG. 11 is a partially enlarged view of part F in FIG. 9.
Figure 12:
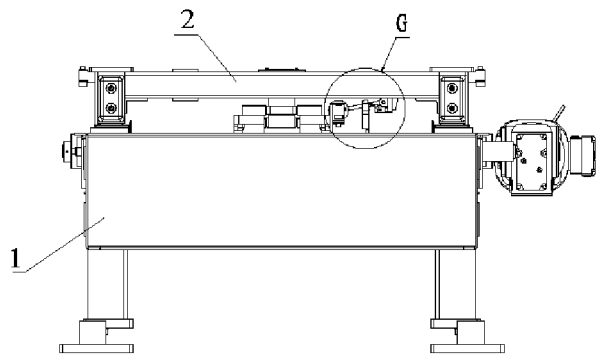
FIG. 12 is a side view of the overall structure of the third embodiment of the present invention.
Figure 13:
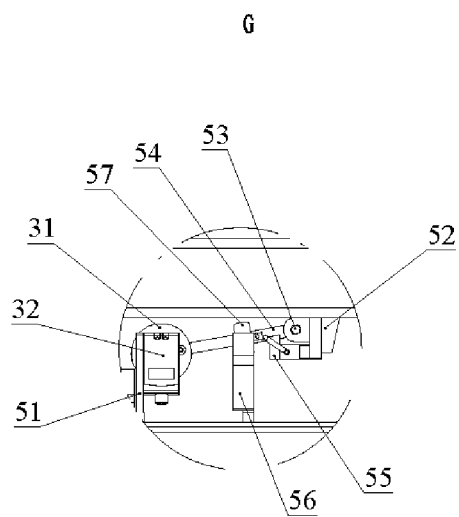
FIG. 13 is a partially enlarged view of part G in FIG. 12.
Figure 14:
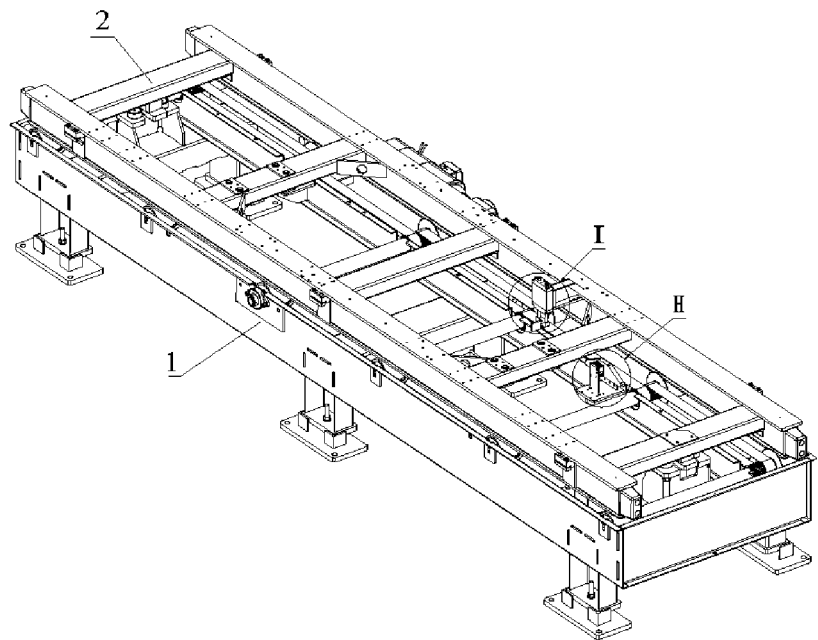
FIG. 14 is an axonometric diagram of an overall structure of a fourth embodiment of the present invention.
Figure 15:
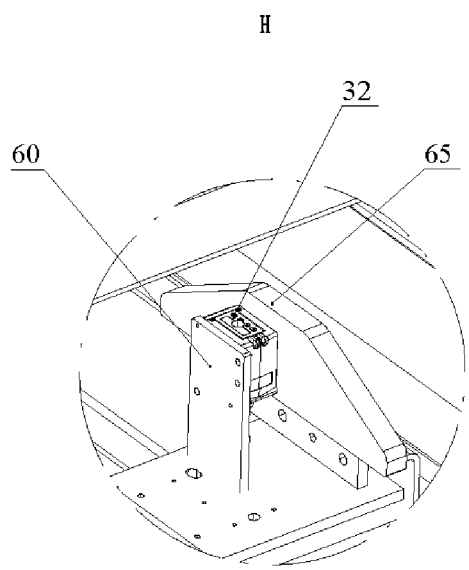
FIG. 15 is a partially enlarged view of part H in FIG. 14.
Figure 16:
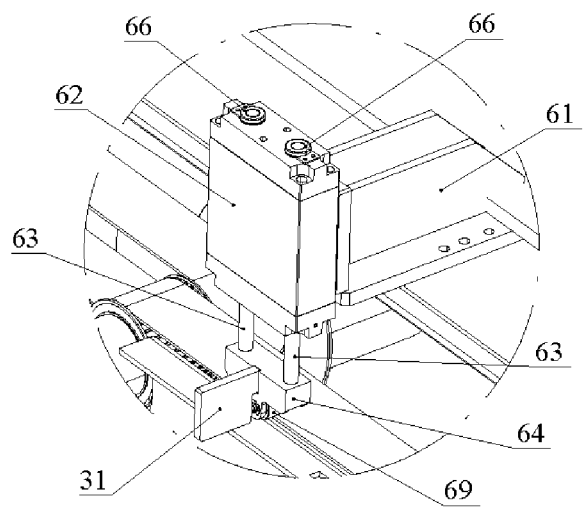
FIG. 16 is a partially enlarged view of part I in FIG. 14.
Figure 17:
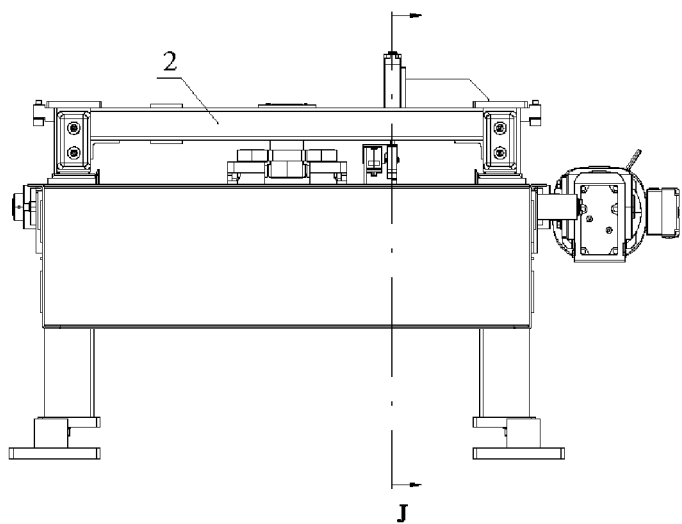
FIG. 17 is a side view of the overall structure of the fourth embodiment of the present invention.
Figure 18:
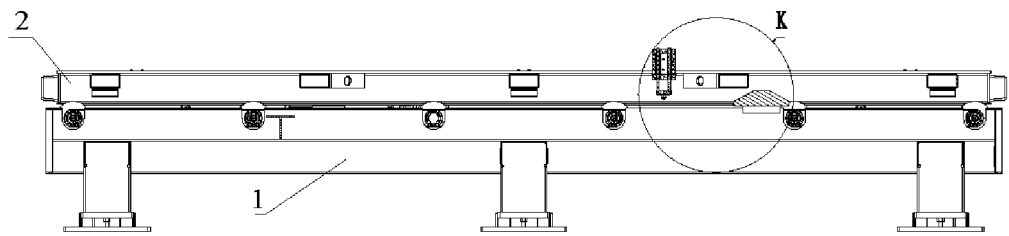
FIG. 18 is a sectional view taken along line J-J in FIG. 17.
Figure 19:
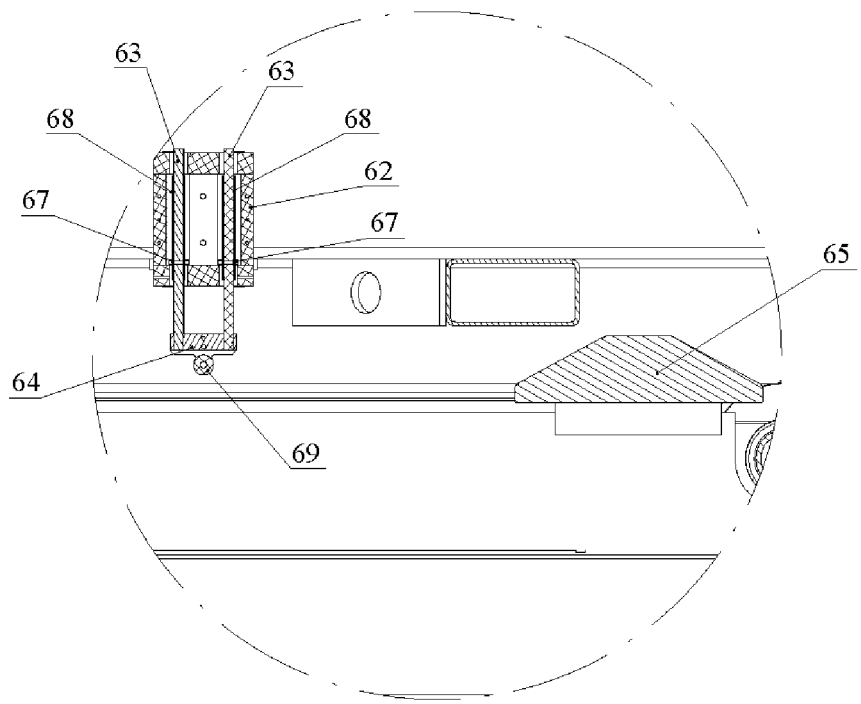
FIG. 19 is a partially enlarged view of part K in FIG. 18.

As a preferred implementation of the present invention, referring to FIG. 6, FIG. 7 and FIG. 8, the reflector 31 is fixed to the conveying trolley 3 via a second mounting plate 71; the distance sensor 32 is mounted on the roller machine 1 via a second mounting seat 71, and the distance sensor 32 is staggered with the reflector 31 in a forward direction of the conveying trolley 2; and, the reflector 31 is inclined to a conveying direction to form a reflective surface directly facing the distance sensor 32. The distance sensor 32 can rotate at a certain angle about a vertical direction of its center within the horizontal plane, so that the distance to the reflector 31 can be detected and collision can be avoided when the reflector 31 passes by the distance sensor 32 along with the conveying trolley 2.

As a preferred implementation of the present invention, referring to FIG. 9 to FIG. 13, the reflector 31 is mounted on the conveying trolley 2 via a swing bar mechanism; the swing bar mechanism includes a third mounting plate 52 provided on the conveying trolley 2, a swing bar 54 hinged onto the third mounting plate 52 via a hinge pin 53, and a bracket 55 capable of limiting the swing angle of the swing bar 54; and the bracket 55 can limit the lowest position of the swing bar in a vertical plane. The reflector 31 is provided at an end of the swing bar 54, and faces a front face of the distance sensor 32 in a normal operation state. The distance sensor 32 is mounted on the roller machine 1 in the forward direction of the reflector 31 via a third mounting seat 51. The roller machine 1 is provided with a first guide seat 56 opposite to the distance sensor 32, and the first guide seat 56 is provided with a second guide face capable of guiding the swing bar 54 to rotate upward about the hinge pin 53 so as to allow the reflector 31 to skim over the distance sensor 32 when moving to a position where the distance sensor 32 is located. The swing bar 54 is provided with a spherical roller 57 capable of being in rolling fit with the second guide face and a second resetting mechanism capable of driving the swing bar 54 to reset. The second resetting mechanism is a tension spring 58. The spherical roller 57 is mounted at a position in the middle portion of the swing bar 54 via a bearing in order to reduce the friction of the swing bar 54 with the second guide face. The swing bar 54 can be closely fitted onto the bracket 55 by virtue of the obliquely downward tension of the tension spring 58. When the reflector 31 moves to the front of the distance sensor 32 along with the conveying trolley 2, the spherical roller 57 on the swing bar 54 can roll along the second guide face of the first guide seat 56 so as to allow the swing bar 54 to rotate about the hinge pin 53, preventing the reflector 31 from colliding with the distance sensor 32 when passing by the distance sensor 32. After passing by the first guide seat 56, the swing bar 54 is reset to the lowest point due to its gravity and the tension of the tension spring 58.

As a preferred implementation of the present invention, referring to FIG. 14 to FIG. 19, the reflector 31 is mounted on the conveying trolley 2 via a climbing mechanism; the climbing mechanism includes a fourth mounting plate 64 disposed on the conveying trolley 2, a guide bar seat 62 disposed on the fourth mounting plate 61, a guide bar 63 mounted on the guide bar seat 62 in such a way that the guide bar is able to float up and down, and a floating seat 64 disposed at a lower end of the guide bar 63. The reflector 31 is directly or indirectly connected to the floating seat 64 and faces a front face of the distance sensor 32, so that the distance sensor 32 can detect the distance to the reflector at any time. The distance sensor 32 is mounted on the roller machine 1 in a forward direction of the reflector 31 via a fourth mounting seat 60. The roller machine 1 is provided with a second guide seat 65 opposite to the distance sensor 32, and the second guide seat 65 has a third guide face capable of guiding the floating seat 64 to float upward so as to allow the reflector 31 to skim over the distance sensor 32 when moving to a position where the distance sensor 32 is located. The position at the highest point of the third guide face is higher than the highest position of the distance sensor 32. The guide bar seat 62 is formed with at least two guide bar via holes running through in an up-and-down direction. Within each guide bar via hole is provided with a guide bar 63 and an oil-free bushing 66 fitted with the corresponding guide bar 63. Each guide bar 63 can slide along a passageway formed by each of two pairs of upper and lower oil-free bushings 66 in a vertical direction. The guide bar 63 is provided with a boss 67, and within the guide bar seat 62 is provided with a third resetting mechanism for resisting against the boss 67 to push the guide bar 63 downward. The third resetting mechanism is a thrust spring 68. The floating seat 64 has a bottom with a roller 69 capable of being in rolling fit with the third guide face. Generally, the thrust spring 68 allows the floating seat 64 to be at the lowest position by compressing the boss 67 on the guide bar 63. When the reflector 31 moves to the front of the distance sensor 32 along with the conveying trolley 2, the roller 69 on the floating seat 64 can roll along the third guide face of the second guide seat 65 so as to allow the floating seat 64 to ascend, preventing the reflector 31 from colliding with the distance sensor 32 when passing by the distance sensor 32. After passing by the second guide seat 65, the floating seat 64 is reset to the lowest point due to its gravity and the compression of the thrust spring 68.

Figure 20:
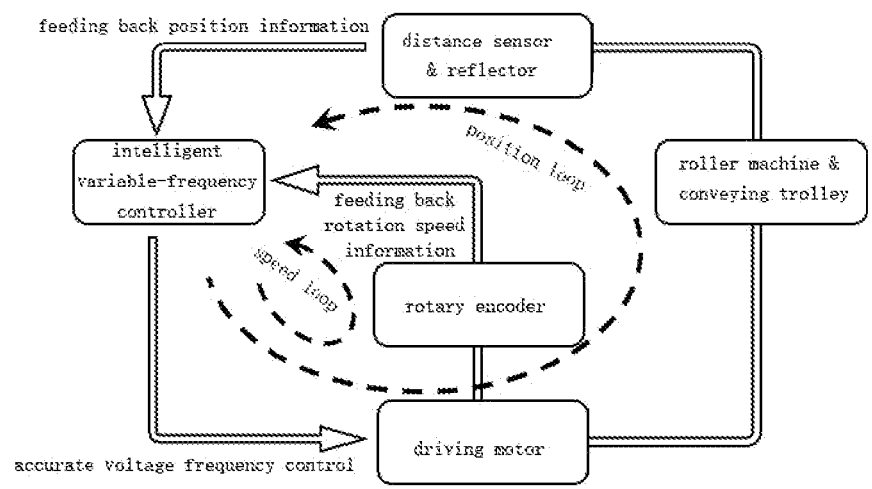
FIG. 20 is a schematic diagram of a double closed loop control mode according to the present invention.

In the present invention, with the intelligent variable-frequency controller, by reading position information fed back by the distance sensor 32 and rotation speed information fed back by the rotary encoder, accurate voltage frequency control information is output by internal operation (the operation belongs to the prior art and will not be improved in the present invention) so as to control the rotation speed of the driving motor 41, so that a double closed loop control mode (a conveying and positioning method) for the conveying and positioning system is realized. Referring to FIG. 20, the double closed loop control mode is realized as follows: the intelligent variable-frequency controller controls the driving motor 41 on the roller machine 1 to drive the roller sets 43 on the roller machine 1 to rotate; the conveying trolley 2 moves horizontally on the roller machine 1 by virtue of the friction between the lower surface of the conveying trolley 2 and the roller sets 43; along with the conveying trolley 2, the reflector 31 disposed on the conveying trolley 2 enters a detection range of the distance sensor 32 disposed on the roller machine 1; and, the distance sensor 32 recognizes position information of the conveying trolley 2 in the conveying process by receiving a signal from the reflector 31, and then feeds back the position information to the intelligent variable-frequency controller. Meanwhile, the rotary encoder 42 feeds back rotation speed information of the driving motor 41 to the intelligent variable-frequency controller. The intelligent variable-frequency controller combines the position information of the conveying trolley 2 fed back by the distance sensor and the rotation speed information of the driving motor 41 fed back by the rotary encoder 42, compares the position information with target position information of the conveying trolley 2 preset in the intelligent variable-frequency controller to output accurate voltage frequency controller information, and controls the rotation speed of the driving motor 41 to allow the guide blocks 11 on the conveying trolley 2, along with the conveying trolley 2, to slow down and enter the position of the guide wheels 12 on the roller machine 1. After the conveying trolley 2 reaches a preset position, the intelligent variable-frequency controller controls the driving motor 41 to stop rotating, so that accurate positioning of the conveying trolley 2 is realized.

Of course, the present invention is not limited to the implementations described above. Those skilled in the art can make equivalent modifications or substitutions without departing from the spirit of the present invention, and these modifications or substitutions shall fall into the scope defined by the claims of the present application.

The invention claimed is:

1. A conveying and positioning system, comprising:
a conveying trolley provided with a reflector,
an intelligent variable-frequency controller, and
a roller machine provided with a driving mechanism capable of driving the conveying trolley to move on the roller machine and a distance sensor capable of cooperating with the reflector to provide position information of the conveying trolley in a conveying process to the intelligent variable-frequency controller, the driving mechanism comprising:
a driving motor controlled by the intelligent variable-frequency controller, and
a rotary encoder capable of feeding back rotation speed information of the driving motor to the intelligent variable-frequency controller.

2. The conveying and positioning system according to claim 1, wherein the reflector is disposed on a mounting plate which is mounted on the conveying trolley via a hinge; the distance sensor is mounted on the roller machine in a forward direction of the mounting plate via a mounting seat; and, the mounting seat is provided with a guide face capable of guiding the mounting plate to rotate about the hinge so as to allow the reflector to skim over the distance sensor when moving to a position where the distance sensor is located.

3. The conveying and positioning system according to claim 2, wherein the mounting plate is mounted at a bottom of the conveying trolley via a top hinge; the mounting plate is formed with a fitting surface at either side of the reflector; the mounting seat is provided with two lugs between which the distance sensor is mounted; the guide face, with an arc shape and capable of fitting with the fitting surface, is formed on a top of each of the two lugs; and, the conveying trolley is provided with a resetting mechanism capable of maintaining the mounting plate in a vertical state.

4. The conveying and positioning system according to claim 1, wherein the reflector is fixed to the conveying trolley via a mounting plate; the distance sensor is mounted to the roller machine via a mounting seat, and the distance sensor is staggered with the reflector in a forward direction of the conveying trolley; and, the reflector is inclined to a conveying direction to form a reflective surface directly facing the distance sensor.

5. The conveying and positioning system according to claim 1, wherein the reflector is mounted on the conveying trolley via a swing bar mechanism; the swing bar mechanism comprises a mounting plate provided on the conveying trolley, a swing bar hinged onto the mounting plate via a hinge pin, and a bracket capable of limiting swing angle of the swing bar; the reflector is disposed on the swing bar, and the distance sensor is mounted on the roller machine in a forward direction of the reflector via a mounting seat; the roller machine is provided with a guide seat opposite to the distance sensor; and, the guide seat is provided with a guide face capable of guiding the swing bar to rotate upward about the hinge pin so as to allow the reflector to skim over the distance sensor when moving to a position where the distance sensor is located.

6. The conveying and positioning system according to claim 5, wherein the swing bar is provided with a spherical roller capable of being in rolling fit with the guide face and a resetting mechanism capable of driving the swing bar to reset.

7. The conveying and positioning system according to claim 1, wherein the reflector is mounted on the conveying trolley via a climbing mechanism; the climbing mechanism comprises a mounting plate disposed on the conveying trolley, a guide bar seat disposed on the mounting plate, a guide bar mounted on the guide bar seat in such a way that the guide bar is able to float up and down, and a floating seat disposed at a lower end of the guide bar; the reflector is directly or indirectly connected to the floating seat; the distance sensor is mounted on the roller machine in a forward direction of the reflector via a mounting seat; the roller machine is provided with a guide seat opposite to the distance sensor; and, the guide seat has a guide face capable of guiding the floating seat to float upward so as to allow the reflector to skim over the distance sensor when moving to a position where the distance sensor is located.

8. The conveying and positioning system according to claim 7, wherein the guide bar seat is provided with at least two guide bar via holes running through in an up-and-down direction; within each guide bar via hole is provided with a guide bar and an oil-free bushing fitted with the corresponding guide bar; the guide bar is provided with a boss, and within the guide bar seat is provided with a resetting mechanism for resisting against the boss so as to push the guide bar downward; and, the floating seat has a bottom with a roller capable of being in rolling fit with the guide face.

9. The conveying and positioning system according to claim 1, wherein the driving mechanism comprises a plurality of roller sets which are provided on the roller machine and driven by the driving motor; the roller sets are successively arranged on the roller machine to form, on its top, a conveying plane for conveying the conveying trolley; each of the roller sets comprises a wheel shaft and a conveying wheel disposed at either end of the wheel shaft, a belt wheel is provided between the conveying wheels at two ends of the wheel shaft, and two adjacent wheel shafts are connected by a synchronous belt mounted between the belt wheels; the roller sets comprise a driving roller set located in the middle of the roller machine and at least one driven roller set distributed at either side of the driving roller set; the driving motor has an output in transmission connection to the driving roller set; and, the conveying trolley is provided with a guide block at a bottom of each of front and rear ends of the conveying trolley, the roller machine is provided with a plurality of guide wheels at each of front and rear ends of the roller machine, and the guide wheels at the front and rear ends of the roller machine form a passageway for guiding the guide blocks to pass therethrough.

10. A conveying and positioning method, comprising:
controlling, by an intelligent variable-frequency controller, a driving motor on a roller machine to drive a conveying trolley to move along the roller machine, such that, along with the conveying trolley, a reflector disposed on the conveying trolley entering a detection range of a distance sensor disposed on the roller machine;
recognizing, by the distance sensor, position information of the conveying trolley in a conveying process by receiving a signal from the reflector, and feeding back the position information to the intelligent variable-frequency controller;
feeding back, by a rotary encoder, rotation speed information of the driving motor to the intelligent variable-frequency controller;
combining, by the intelligent variable-frequency controller, the position information of the conveying trolley fed back by the distance sensor and the rotation speed information of the driving motor fed back by the rotary encoder, and comparing the position information with a target position information of the conveying trolley preset in the intelligent variable-frequency controller;
outputting an accurate voltage frequency controller information to control the rotation speed of the driving motor to slow down the conveying trolley; and,
controlling, by the intelligent variable-frequency controller, the driving motor to stop rotating upon the conveying trolley reaching a preset position, so that realizing an accurate positioning for the conveying trolley.

* * * * *